(12) United States Patent
Fukawatase et al.

(10) Patent No.: US 7,766,373 B2
(45) Date of Patent: Aug. 3, 2010

(54) PASSENGER-SEAT AIRBAG DEVICE AND METHOD OF FOLDING PASSENGER-SEAT AIRBAG

(75) Inventors: Osamu Fukawatase, Aichi-ken (JP); Seiji Yamada, Okazaki (JP); Kenichi Takenaka, Chiryu (JP); Shinya Suzuki, Yokohama (JP); Satoru Hirai, Kanagawa-ken (JP)

(73) Assignees: Toyota Jidosha Kabushiki Kaisha, Toyota-shi, Aichi-ken (JP); Kanto Auto Works, Ltd., Kanagawa-ken (JP)

(*) Notice: Subject to any disclaimer, the term of this patent is extended or adjusted under 35 U.S.C. 154(b) by 22 days.

(21) Appl. No.: 11/791,864

(22) PCT Filed: Sep. 25, 2006

(86) PCT No.: PCT/IB2006/002644

§ 371 (c)(1),
(2), (4) Date: May 30, 2007

(87) PCT Pub. No.: WO2007/034315

PCT Pub. Date: Mar. 29, 2007

(65) Prior Publication Data

US 2008/0106081 A1 May 8, 2008

(30) Foreign Application Priority Data

Sep. 26, 2005 (JP) .............................. 2005-278824

(51) Int. Cl.
*B60R 21/233* (2006.01)
*B60R 21/237* (2006.01)
*B60R 21/26* (2006.01)

(52) U.S. Cl. ............... 280/729; 280/730.1; 280/743.1; 280/740

(58) Field of Classification Search ............. 280/729, 280/743.1, 730.1, 730.2, 740
See application file for complete search history.

(56) References Cited

U.S. PATENT DOCUMENTS 5,308,108 A * 5/1994 Rion ..................... 280/728.2
5,425,551 A * 6/1995 Hawthorn .............. 280/743.1

(Continued)

FOREIGN PATENT DOCUMENTS

JP    11-170955    6/1999

(Continued)

OTHER PUBLICATIONS

Japanese Office Action dated Apr. 22, 2008.

*Primary Examiner*—Lesley D. Morris
*Assistant Examiner*—George D. Spisich
(74) *Attorney, Agent, or Firm*—Finnegan, Henderson, Farabow, Garrett & Dunner, LLP

(57) ABSTRACT

A passenger-seat airbag includes a left airbag and a right airbag. A root portion connects a left-airbag root portion and a right-airbag root portion. An accordion-folded portion with relatively small folding widths is formed by accordion-folding both side portions of the root portion, whereby at least a gas-injection hole closest to each of both ends of an inflator in a longitudinal direction among a plurality of the gas-injection holes of the inflator is prevented from being closed by the root portion when the passenger-seat airbag is provided in a vehicle.

8 Claims, 20 Drawing Sheets

U.S. PATENT DOCUMENTS

| | | | |
|---|---|---|---|
| 5,775,730 A * | 7/1998 | Pripps et al. | 280/740 |
| 5,918,898 A * | 7/1999 | Wallner et al. | 280/728.2 |
| 6,186,544 B1 | 2/2001 | Igawa | |
| 6,196,585 B1 | 3/2001 | Igawa | |
| 6,247,727 B1 | 6/2001 | Hamada et al. | |
| 6,547,279 B1 * | 4/2003 | Amamori | 280/743.1 |
| 6,802,534 B2 * | 10/2004 | Neupert | 280/743.1 |
| 6,834,886 B2 | 12/2004 | Hasebe et al. | |
| 6,969,086 B2 | 11/2005 | Hasebe et al. | |
| 2004/0160041 A1 * | 8/2004 | Hasebe et al. | 280/729 |
| 2004/0160048 A1 | 8/2004 | Hasebe et al. | |
| 2004/0195807 A1 | 10/2004 | Hasebe et al. | |
| 2004/0239085 A1 | 12/2004 | Vitet | |
| 2005/0212275 A1 * | 9/2005 | Hasebe | 280/743.1 |

FOREIGN PATENT DOCUMENTS

| | | |
|---|---|---|
| JP | 11-321511 | 11/1999 |
| JP | 2004-34989 | 2/2004 |
| JP | 2004-268903 | 9/2004 |
| JP | 2007-30614 | 2/2007 |

* cited by examiner

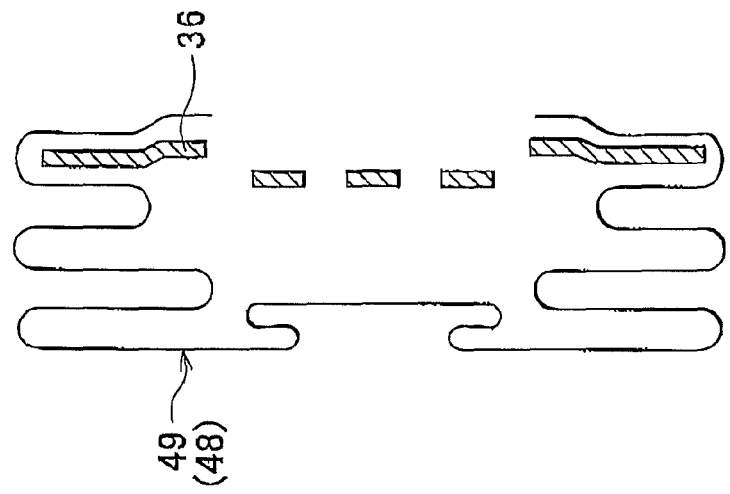
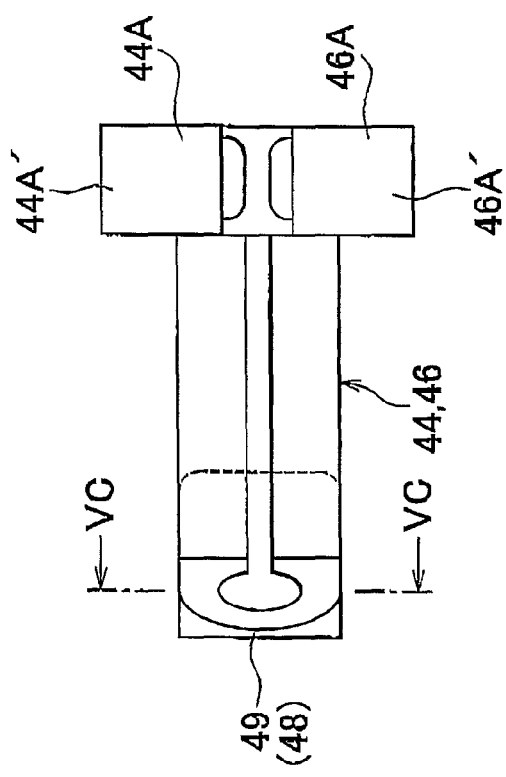
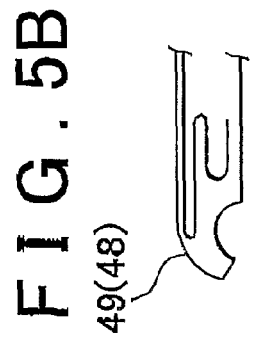

44, 46

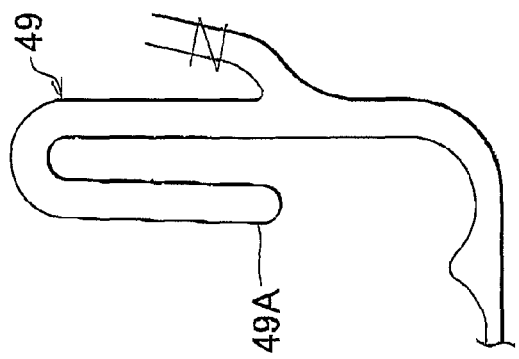
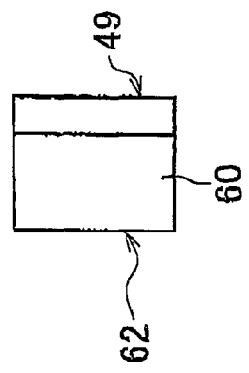
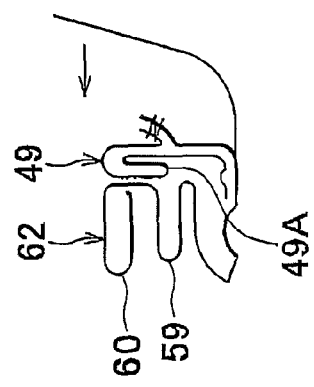

ND METHOD OF FOLDING PASSENGER-SEAT AIRBAG

PASSENGER-SEAT AIRBAG DEVICE AND METHOD OF FOLDING PASSENGER-SEAT AIRBAG

CROSS-REFERENCE TO RELATED APPLICATIONS

This application is a national phase application of International Application No. PCT/IB2006/002644, filed Sep. 25, 2006, and claims the priority of Japanese Application No. 2005-278824, filed Sep. 26, 2005, the content of both of which is incorporated herein by reference.

BACKGROUND OF THE INVENTION

1. Field of the Invention

The invention relates to a passenger-seat airbag device in which a passenger-seat airbag is inflated and deployed at the time of frontal collision, and a method of folding the passenger-seat airbag that is folded and stored in the passenger-seat airbag device.

2. Description of the Related Art

Conventionally, a passenger-seat airbag device is provided to protect an occupant seated at a passenger seat from an impact at the time of frontal collision. Japanese Patent Application Publication JP-A-2004-268903 describes an example of a passenger-seat airbag device in which a passenger-seat airbag includes a pair of left and right airbags, and a recess is formed between the left and right airbags. When the passenger-seat airbag starts to be deployed, the passenger-seat airbag receives a plurality of areas of the occupant's body, such as the shoulders. As a result, the load applied to the occupant is dispersed and reduced.

With this configuration, the airbag is ordinarily folded and stored, for example, below the top wall portion of an instrument panel. When a frontal collision occurs, the airbag opens an airbag door provided in the top wall portion of the instrument panel. Then, the airbag hits the windshield, and the airbag is deployed toward the rear of the vehicle. As a result, the airbag receives the shoulders and the like of the occupant seated at the passenger seat to absorb the impact. Accordingly, as the accuracy of the direction in which the airbag is deployed is higher, the performance of protecting the occupant is more stable.

However, in Japanese Patent Application Publication JP-A-2004-268903, the root portion of the folded airbag is positioned above the gas-injection holes of the inflator. Therefore, a gas passage through which a sufficient amount of gas flows cannot be formed above the gas-injection holes of the inflator when the airbag starts to be deployed. Thus, the gas flows into the left and right airbags, and the left and right airbags contact the windshield and the instrument panel, before the root portion of the airbag is sufficiently inflated. That is, the left and right airbags contact the windshield and the instrument panel slowly. As a result, the left and right airbags are likely to move upward or downward. This makes it difficult to stabilize the direction in which the airbag is deployed.

SUMMARY OF THE INVENTION

It is an object of the invention to provide a passenger-seat airbag device and a method of folding a passenger-seat airbag that improve the accuracy of the direction in which the passenger-seat airbag is deployed.

A first aspect of the invention relates to a passenger-seat airbag device that includes a passenger-seat airbag that includes a left airbag and a right airbag that correspond to the shoulders of an occupant seated at a passenger seat, and a root portion that connects a left-airbag root portion and a right-airbag root portion; and a gas supply means which is formed to be elongate, which has a plurality of gas-supply holes, and which supplies gas into the passenger-seat airbag through the plurality of the gas-supply holes when a collision occurs. In the passenger-seat airbag device, the gas supply means and the passenger-seat airbag that is in a folded state are stored in an airbag case fixed in an instrument panel. An accordion-folded portion is formed by accordion-folding both side portions of the root portion only at positions corresponding to both end portions of the gas-supply means in a longitudinal direction of the gas-supply means, the both side portions being accordion-folded along the longitudinal direction of the gas supply means, whereby at least one of the plurality of the gas-supply holes of the gas supply means is prevented from being closed by the root portion that is in a folded state when the passenger-seat airbag device is provided in a vehicle.

According to the first aspect, when the passenger-seat airbag device operates at the time of collision, the gas is supplied to the root portion of the passenger-seat airbag from the plurality of the gas-supply holes of the gas supply means. The root portion connects the left-airbag root portion and the right-airbag root portion. Therefore, the gas supplied to the root portion flows into the left airbag and the right airbag. Thus, left airbag and the right airbag are deployed toward the passenger seat. The left airbag receives the left shoulder of the occupant seated at the passenger seat. The right airbag receives the right shoulder of the occupant. Both of the airbags receive the upper part of the occupant's body such that the upper part of the occupant's body is in a stable state. Thus, the left and right airbags absorb the impact at the time of frontal collision, and the load applied to the occupant from the airbags is dispersed and reduced.

According to the first aspect, the accordion-folded portion is formed by accordion-folding both side portions of the root portion only at positions corresponding to both end portions of the gas-supply means in the longitudinal direction of the gas-supply means, the both side portions being accordion-folded along the longitudinal direction of the gas supply means, whereby at least one of the plurality of the gas-supply holes of the gas supply means is prevented from being closed by the root portion that is in a folded state when the passenger-seat airbag device is provided in the vehicle. This avoids the situation where all the gas-supply holes of the gas supply means are closed by the folded root portion. Accordingly, a gas passage can be formed above at least one of the gas-supply holes of the gas supply means. As a result, immediately after the passenger-seat airbag device operates, the gas is quickly supplied to the root portion from the gas supply means, and the root portion is quickly inflated. As a result, the left and right airbags are stably deployed by the reaction force from the root portion that is sufficiently inflated.

That is, according to the first aspect, it is possible to avoid in advance the situation where all the gas-injection holes of the gas supply means are closed by the root portion that is in a folded state when the passenger-seat airbag device is provided in the vehicle. Therefore, the root portion that connects the left-airbag root portion and the right-airbag root portion can be quickly and reliably inflated so that the root portion functions as "a wall" in an extremely early stage. As a result, according to the invention, it is possible to extremely effectively stabilize the direction in which the left and right airbags are expanded and deployed toward the passenger seat.

As described above, in the passenger-seat airbag device according to the first aspect of the invention, it is possible to improve the accuracy of the direction in which the passenger-seat airbag is deployed.

In the first aspect, the folding width of the accordion-folded portion, which is a distance between a ridge and a trough of the accordion-folded portion, at a position close to the gas supply means may be smaller than the folding width of the accordion-folded portion at a position distant from the gas supply means.

According to the above-described aspect, when the root portion is compressed in the vehicle-height direction, and the passenger-seat airbag device is provided in the vehicle, at least a gas-supply hole closest to each of both ends of the gas supply means in the longitudinal direction among the plurality of the gas-supply holes of the gas supply means can be prevented from being closed by the folded root portion.

In the first aspect, a bell portion that has a substantially triangle shape may be formed by unfolding a left inner portion and a right inner portion of the accordion-folded portion of the root portion, and moving the left inner portion and the right inner portion toward a center of the passenger-seat airbag. This prevents the root portion from closing the passage for the gas injected through the gas-supply holes.

In the first aspect, the gas supply means may be an inflator having a substantially cylindrical shape. In this case, the plurality of the gas-supply holes are a plurality of gas-injection holes that are formed in a peripheral wall of the inflator. The gas is supplied to the root portion through the plurality of the gas-injection holes.

According to the above-described aspect, the gas supply means is the inflator having a substantially cylindrical shape, and the gas injected through the gas-injection holes of the inflator is supplied to the root portion of the passenger-seat airbag.

In the above-described aspect, the at least one of the plurality of the gas-injection holes of the inflator is prevented from being closed by the accordion-folded portion of the root portion. Thus, the same effects as those obtained in the first aspect can be obtained. That is, it is possible to avoid the situation where all the gas-injection holes of the inflator are closed by the folded root portion. Accordingly, the gas passage can be formed above the at least one of the gas-injection holes of the inflator, and the root portion can be quickly inflated and deployed.

In the passenger-seat airbag device according to the above-described aspect of the invention, it is possible to improve the accuracy of the direction in which the passenger-seat airbag is deployed, when the passenger-seat airbag device does not include a flow-adjusting means for adjusting the flow of the gas.

In the first aspect, the gas supply means may be a flow-adjusting means. In this case, the plurality of the gas-supply holes are a plurality of flow-adjusting holes of the flow-adjusting means. A flow of the gas is adjusted through the plurality of the flow-adjusting holes, and then the gas is supplied to the root portion.

According to the above-described aspect, the gas supply means is the flow-adjusting means for adjusting the flow of the gas supplied to the root portion. The flow of the gas is adjusted through the flow-adjusting holes of the flow-adjusting means, and then the gas is supplied to the root portion of the passenger-seat airbag.

In the above-described aspect, at least one of the plurality of the flow-adjusting holes of the flow-adjusting means is prevented from being closed by the accordion-folded portion of the root portion. Therefore, the same effects as those obtained in the first aspect can be obtained. That is, it is possible to avoid the situation where all the flow-adjusting holes of the flow-adjusting means are closed by the folded root portion. Accordingly, a gas passage can be formed above at least one of the flow-adjusting holes of the flow-adjusting means. As a result, the root portion can be quickly inflated and deployed.

In the passenger-seat airbag device according to the above-described aspect of the invention, it is possible to improve the accuracy of the direction in which the passenger-seat airbag is deployed, when the passenger-seat airbag device includes the flow-adjusting means for adjusting the flow of the gas.

In the above-described aspect, the gas supply means may include an inflator that has a plurality of gas-injection holes, and a retainer that has a plurality of flow-adjusting holes. In this case, the plurality of the gas supply holes are the plurality of the flow-adjusting holes. A flow of the gas injected through the gas-injection holes is adjusted through the plurality of the flow-adjusting holes, and then the gas is supplied to the root portion. Further, the retainer may include the plurality of the flow-adjusting holes and a wall. In this case, the plurality of the gas-injection holes are disposed at positions facing the wall.

A second aspect of the invention relates to a method of folding a passenger-seat airbag that includes a left airbag and a right airbag that correspond to the shoulders of an occupant seated at a passenger seat, and a root portion that receives gas supplied from a gas-supply means that is formed to be elongate, and that supplies the gas through a plurality of gas-supply holes when the gas-supply means operates, the root portion connecting a left-airbag root portion and a right-airbag root portion. The method includes folding each of the left and right airbags such that each of the left and right airbags has a strip shape, overlapping the left and right airbags with each other, and then folding the left and right airbags that are overlapped with each other, toward one side in a longitudinal direction of the left and right airbags to form an airbag folded portion, wherein the left and right airbags are positioned closer to the rear of a vehicle than the root portion is when the passenger-seat airbag is provided in the vehicle: and making the root portion slack to form a slack portion, and making the slack portion upright along the airbag folded portion. Both side portions of the root portion are accordion-folded along a longitudinal direction of the gas supply means, only at positions corresponding to both end portions of the gas-supply means in the longitudinal direction during a period from step of forming the airbag folded portion until the step of folding the root portion, whereby at least one of the plurality of the gas-supply holes of the gas supply means is prevented from being closed by the root portion that is in a folded state when the passenger-seat airbag is provided in a vehicle.

The method of folding the passenger-seat airbag according to the second aspect is as follows. First, each of the left and right airbags is folded to have a strip shape, the left and right airbags are overlapped with each other, and then the left and right airbags that are overlapped with each other are folded toward one side in the longitudinal direction of the left and right airbags. Thus, the airbag folded portion of the passenger-seat airbag, which is equivalent to the left and right airbags, is formed. Next, the root portion that connects the left-airbag root portion and the right-airbag root portion is made slack to form the slack portion. The slack portion is made upright along the airbag folded portion. The passenger-seat airbag that is folded in the above-described manner is provided in the vehicle such that the airbag folded portion is positioned closer to the rear of the vehicle than the root portion is, and the root portion is positioned closer to the front of the vehicle than the airbag folded portion is.

According to the second aspect, when operating the passenger-seat airbag device in which the slack portion that forms the root portion and the airbag folded portion are positioned in the fore-and-aft direction in the above-described manner, the gas injected through the gas-supply holes of the gas supply means flows into the root portion that is made upright along the airbag folded portion earlier than into the airbag folded portion that is formed by folding each of the left and right airbags so that each of the left and right airbags has a strip shape, and then folding the left and right airbags that are overlapped with each other, to one side in the longitudinal direction of the left and right airbags. Therefore, the root portion is expanded and deployed earlier, and "a wall" is formed at the position close to the front of the vehicle. After the wall is formed, the airbag folded portion is unfolded, and the left and right airbags are deployed toward the occupant seated at the passenger seat. Because the root portion that connects the left-airbag root portion and the right-airbag root portion forms the "wall" at this time, it is possible to extremely effectively stabilize the direction in which the left and right airbags are expanded and deployed toward the passenger seat.

Further, according to the second aspect, both side portions of the root portion are accordion-folded along a longitudinal direction of the gas supply means, only at positions corresponding to both end portions of the gas-supply means in the longitudinal direction during a period from the step of forming the airbag folded portion until the step of folding the root portion, whereby at least one of the plurality of the gas-supply holes of the gas supply means is prevented from being closed by the root portion that is in a folded state when the passenger-seat airbag is provided in a vehicle. Thus, it is possible to avoid in advance the situation where all the gas-injection holes of the gas supply means are closed by the folded root portion when the folded passenger-seat airbag is provided in the vehicle. Therefore, the root portion that connects the left-airbag root portion and the right-airbag root portion can be quickly and reliably inflated so that the root portion functions as "a wall" in an extremely early stage. As a result, according to the invention, it is possible to extremely effectively stabilize the direction in which the left and right airbags are expanded and deployed toward the passenger seat.

According to the second aspect, it is possible to improve the accuracy of the direction in which the passenger-seat airbag is deployed.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 4A is a plan view, FIG. 4B is a front view, and FIG. 4C is a lateral view;

FIGS. 5A to 5C are diagrams showing the processes of the method of folding the passenger-seat airbag according to the embodiment of the invention, FIG. 5A is a plan view, FIG. 5B is a partial front view, and FIG. 5C is an enlarged cross sectional view taken along line VC-VC of FIG. 5A;

FIG. 6A is a plan view, FIG. 6B is a partial front view, and FIG. 6C is a lateral view;

FIG. 7A is a plan view, and FIG. 7B is a front view;

FIG. 8A is a plan view, and FIG. 8B is a front view;

FIG. 9A is a plan view, and FIG. 9B is a front view;

FIG. 10A is a plan view, and FIG. 10B is a front view;

FIGS. 11A to 11C are diagrams showing the processes of the method of folding the passenger-seat airbag according to the embodiment of the invention, FIG. 11A is a plan view, and FIGS. 11B and 11C are enlarged front views each showing the main portion of the passenger-seat airbag;

FIG. 13A is a longitudinal cross sectional view showing the state of the passenger-seat airbag that starts to be deployed, FIG. 13B is a longitudinal cross sectional view showing the state of the passenger-seat airbag in which the slack portion is expanded, and FIG. 13C is a longitudinal cross sectional view showing the state of the passenger-seat airbag that is being deployed;

DETAILED DESCRIPTION OF THE EXAMPLE EMBODIMENTS

Hereinafter, a method of folding a passenger-seat airbag according to each of embodiments of the invention will be described with reference to FIG. 1 to FIG. 20. In FIG. 1 to FIG. 20, an arrow FR indicates the front of a vehicle, an arrow UP indicates the top of the vehicle, an arrow IN indicates the inside of the vehicle in a vehicle-width direction, and an arrow OUT indicates the outside of the vehicle in the vehicle-width direction.

I. Entire Configuration of the Passenger-Seat Airbag Device 10

Figure 1:
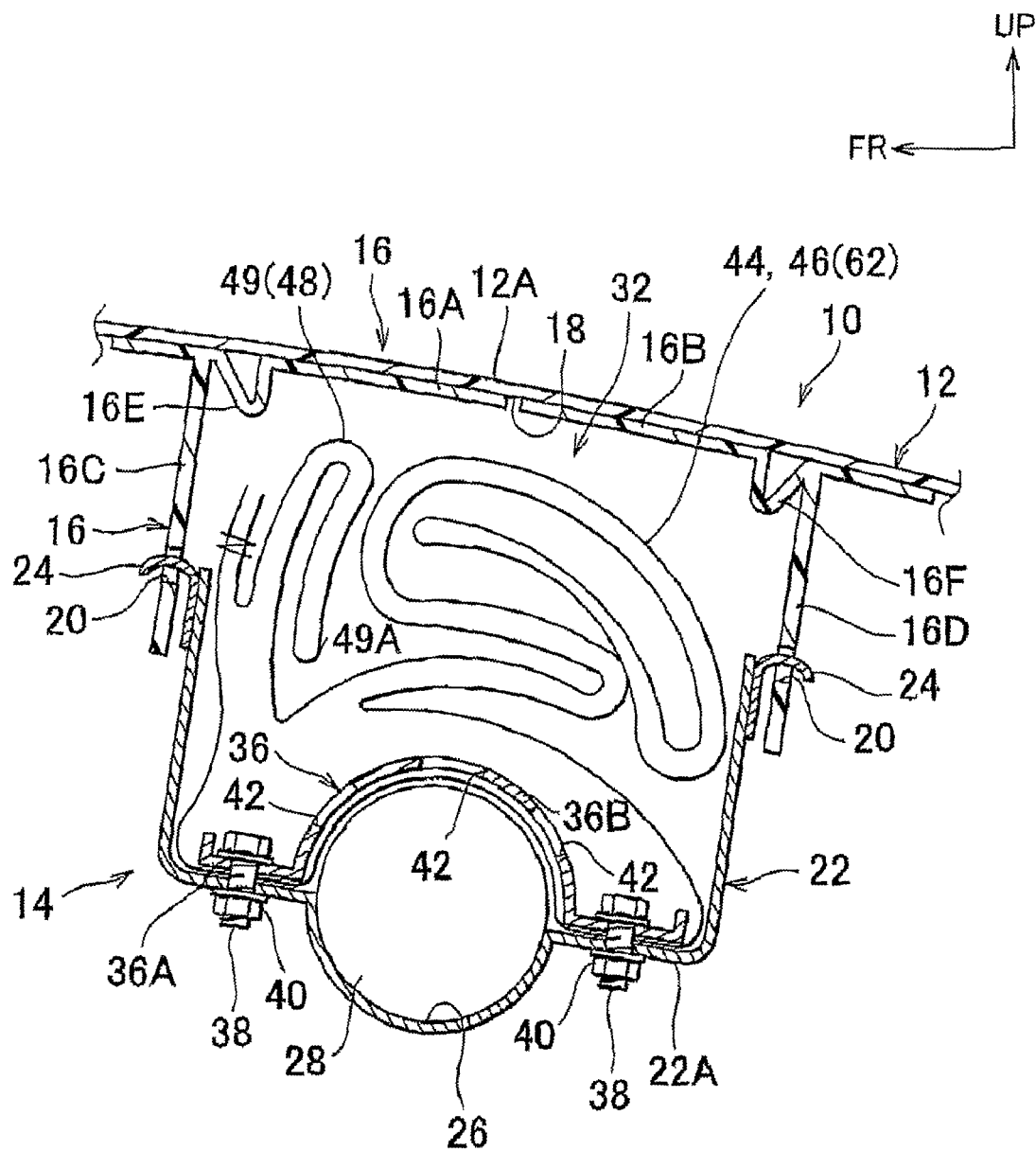
FIG. 1 is a longitudinal cross sectional view showing a passenger-seat airbag device that includes an airbag folded by the method of folding a passenger-seat airbag according to an embodiment of the invention, and that is provided in a vehicle.
Figure 2:
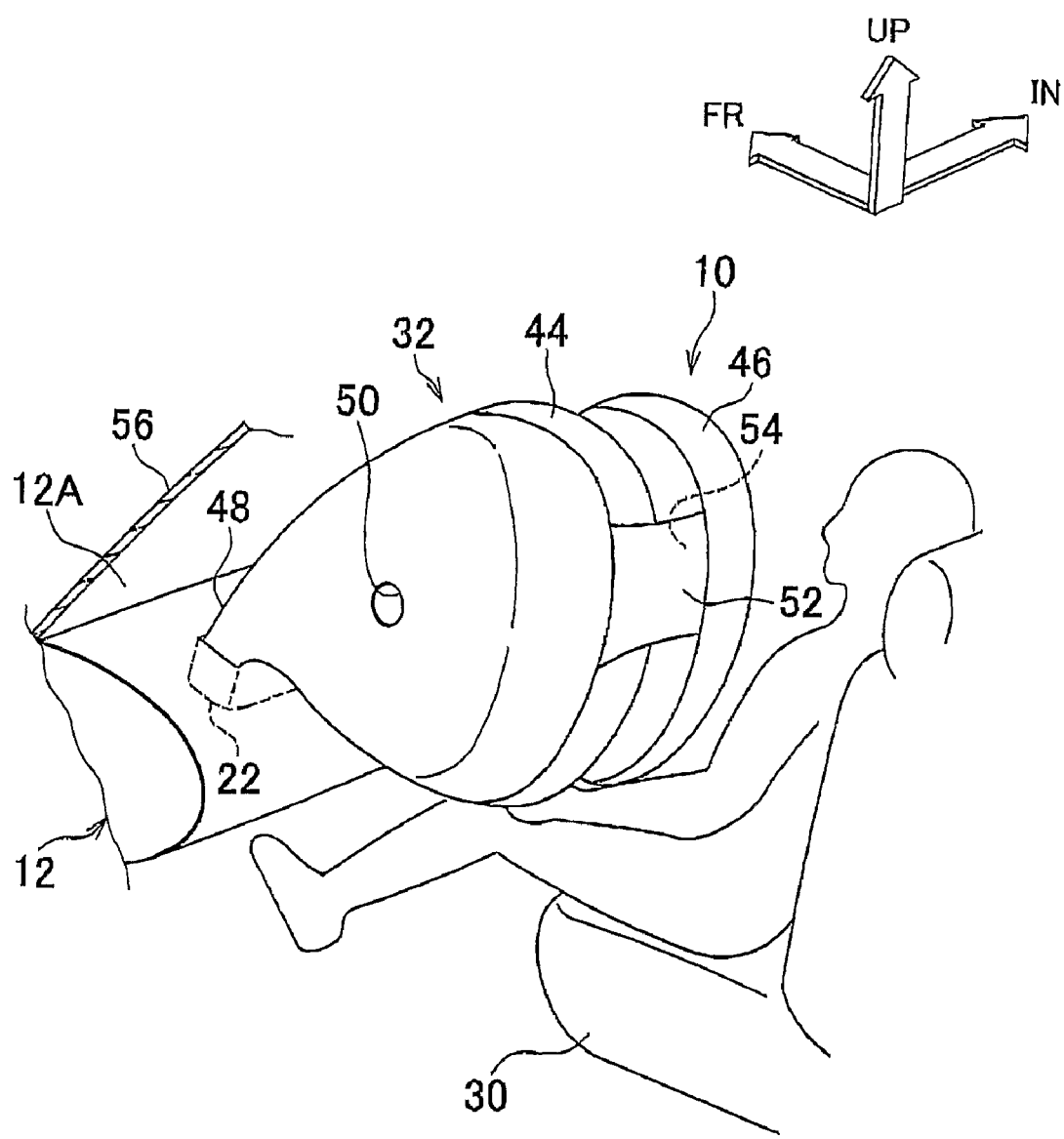
FIG. 2 is a perspective view showing the operating state of the passenger-seat airbag device shown in FIG. 1.

FIG. 1 is a longitudinal sectional view showing a passenger-seat airbag device 10 according to an embodiment of the invention, which is provided in the vehicle. FIG. 2 is a perspective view showing the passenger-seat airbag device 10 that is operated.

As shown in FIG. 1 and FIG. 2, the passenger-seat airbag device 10 is provided under a top wall portion 12A of an instrument panel 12 at a position near the passenger seat. The passenger-seat airbag device 10 includes an airbag module 14 and an airbag door 16. Functional components are stored in the airbag module 14. The airbag door 16 closes an opening at the upper end of the airbag module 14.

The airbag door 16 is provided on the rear side of the top wall portion 12A of the instrument panel 12. The airbag door 16 includes a pair of pivot portions 16A and 16B; and a pair of leg portions 16C and 16D. The pivot portions 16A and 16B pivot toward the front and rear of the vehicle, respectively. The leg portion 16C extends from the rear side of the pivot portion 16A substantially toward the bottom of the vehicle. The leg portion 16D extends from the rear side of the pivot portion 16B substantially toward the bottom of the vehicle. An opening 20 is formed in each of the leg portions 16C and 16D. The pivot portions 16A and 16B are connected to the leg portions 16C and 16D via hinges 16E and 16F, respectively. A tear line 18, which has a substantially H-shape in a plan view, is provided in the airbag door 16. The tear line 18 is invisible. When the expansion pressure of the airbag, which is greater than or equal to a predetermined value, is applied to the tear line 18, the tear line 18 is torn so that the pivot portions 16A and 16B pivot toward the front and rear of the vehicle, respectively.

The airbag module 14 includes an airbag case 22 that has a substantially box shape. The airbag case 22 is supported by a reinforcement member (not shown) such as an instrument panel reinforcement, via a bracket. An engagement portion 24, which has a hook shape, is provided in each of the front wall and rear wall of the airbag case 22. The openings 20 of the leg portions 16C and 16D are engaged with the engagement portions 24 so that the airbag door 16 is fitted to the airbag case 22.

A recess 26, which is a portion protruding toward the bottom of the vehicle, is formed in the bottom wall 22A of the airbag case 22 at the center in a fore-and-aft direction. The recess 26 has a semi-circular cross section. An inflator 28, which has a substantially cylindrical shape, is housed in the recess 26. A passenger-seat airbag 32, which is folded, is housed above the inflator 28. When the inflator 28 injects gas, the passenger-seat airbag 32 is inflated, which opens the airbag door 16. Thus, the passenger-seat airbag 32 is expanded toward an occupant seated at the passenger seat 30.

An opening is formed in a root portion 48 (described later) of the passenger-seat airbag 32. Gas is supplied to the passenger-seat airbag 32 through the opening. A metallic retainer 36, which is regarded as a flow-adjusting means, is fitted to the inside of the opening. The retainer 36 includes an outer periphery 36A and a body 36B inside the outer periphery 36A. The outer periphery 36A has a substantially rectangular-frame shape. The body 36B has a hollow semi-cylindrical shape. The upper half of the inflator 28 is fitted in the body 36B. Bolts 38, which protrude from the outer periphery 36A of the retainer 36 toward the bottom of the vehicle, are screwed into nuts 40. As a result, the retainer 36 is fixed to the bottom wall 22A of the airbag case 22, and the inflator 28 is fixed to the recess 26 of the bottom wall 22A. A plurality of openings 42, which are regarded as flow-adjusting holes, are formed in the body 36B of the retainer 36. Thus, the retainer 36 functions as a diffuser that adjusts the flow of gas.

A plurality of gas-injection holes 70 (refer to FIG. 19 and FIG. 20) are formed in a predetermined arrangement in the peripheral wall of the inflator 28 at predetermined positions. For example, in this embodiment, six gas-injection holes 70 are formed in a plan view, and six gas-injection holes 70 are formed in a bottom view. That is, twelve gas-injection holes 70 in total are formed in the peripheral wall of the inflator 28. In FIGS. 19 and 20, three gas-injection holes 70 formed in one half of the upper surface of the inflator 28, and three gas-injection holes 70 formed in one half of the lower surface of the inflator 28 are shown. When a front airbag sensor and a center airbag sensor (neither of them are shown) detect a frontal collision, an airbag ECU (not shown) operates the inflator 28 so that gas is injected through the plurality of the gas-injection holes. The front airbag sensor is provided in the front portion of the vehicle at a predetermined position. The center airbag sensor is provided in the center portion of the vehicle.

Next, the structure of the passenger-seat airbag 32 that is expanded by the gas injected from the inflator 28 will be described.

Figure 3:
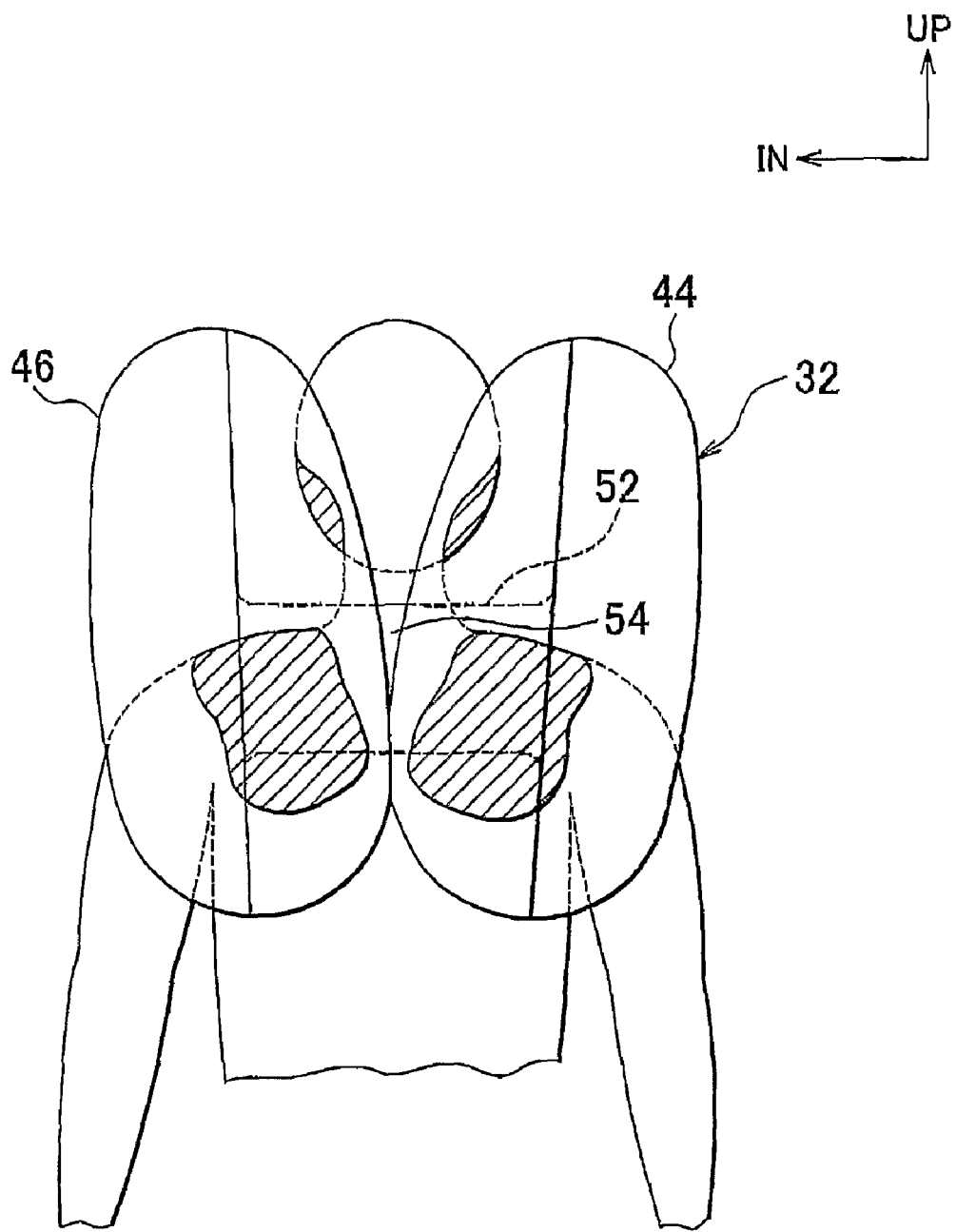
FIG. 3 is a schematic diagram showing the areas of the occupant's body where loads are applied when the passenger-seat airbag according to the embodiment of the invention is deployed.

As shown in FIG. 2 and FIG. 3, the passenger-seat airbag 32 includes a left airbag 44, a right airbag 46, and a root portion 48. The left airbag 44 is inflated ahead of, and on the left side of the occupant seated at the passenger seat so that the left airbag 44 receives mainly the left shoulder of the occupant. The right airbag 46 is inflated ahead of, and on the right side of the occupant so that the right airbag 46 receives mainly the right shoulder of the occupant. The root portion 48 connects the root portion of the left airbag 44 (i.e., left-airbag root portion) and the root portion of the right airbag 46 (i.e., right-airbag root portion).

In a plan view, each of the left airbag 44 and the right airbag 46 is formed such that the length in the vehicle-width direction is smaller than the length in the vehicle-height direction. In a lateral view, each of the left airbag 44 and the right airbag 46 is formed such that the length in the vehicle-height direction increases from a front end toward a rear end. A vent hole 50 is formed near the center of the outer portion of each of the left airbag 44 and the right airbag 46 (refer to FIG. 2). When the left airbag 44 and the right airbag 46 receive the occupant, the gas is discharged through the vent holes 50 so that the pressure inside the airbags is reduced.

When the passenger-seat airbag 32 is inflated, the substantially center of the inner portion of the left airbag 44 contacts the substantially center of the inner portion of the right airbag 46. This prevents the left airbag 44 and the right airbag 46 from being bent at the center positions thereof when the occupant moves toward the front of the vehicle due to inertia and a load is applied to the rear ends of the left airbag 44 and the right airbag 46 by the occupant at the time of frontal collision.

A tie panel 52 made of cloth connects the rear end of the left airbag 44 with the rear end of the right airbag 46 in the vehicle-width direction. The tie panel 52 has a rectangular shape when viewed from the occupant side. The tie panel 52 is provided at such a position and in such a range that the tie panel 52 can receive the chest of the occupant when the occupant moves toward the front of the vehicle due to inertia at the time of frontal collision. Thus, the tie panel 52 softly receives the chest of the occupant at the time of frontal collision. As described above, when the left airbag 44 and the right airbag 46 are inflated, the inner portion of the left airbag 44 contacts the inner portion of the right airbag 46, which reduces a space 54 on the rear side of the tie panel 52. This prevents the chest of the occupant from being excessively inserted between the left airbag 44 and the right airbag 46. In a broad sense, the tie panel 52 is a member that connects the rear end of the left airbag 44 with the rear end of the right airbag 46 in the vehicle-width direction.

The shaded areas in FIG. 3 schematically show the areas of the occupant's body where loads are applied from the left airbag 44 and the right airbag 46 at the time of frontal collision. Thus, as shown in FIG. 3, the load applied to the occupant is dispersed.

As described above, the root portion 48 connects the root portion of the left airbag 44 (left-airbag root portion) with the root portion of the right airbag 46 (right-airbag root portion). That is, the left airbag 44 and the right airbag 46 have the root portion 48 in common. When the inflator 28 injects gas into the root portion 48, the passenger-seat airbag 32, which is folded in the manner described below, is inflated.

II. Method of Folding the Passenger-Seat Airbag 32

Next, the method of folding the passenger-seat airbag 32 according to the embodiment will be described.

Because the tie panel 52 connects the left airbag 44 with the right airbag 46, the left airbag 44 and the right airbag 46 are folded individually. More specifically, first, the left airbag 44 is laid. The lower portion of the left airbag 44, which is the lower one-third portion of the left airbag 44 in the vehicle-height direction when the left airbag 44 is deployed in the vehicle, is accordion-folded toward the center of the left airbag 44. The upper portion of the left airbag 44, which is the upper one-third portion of the left airbag 44 in the vehicle-height direction when the left airbag 44 is deployed in the vehicle, is rolled up toward the center of the left airbag 44. Accordingly, the length of the left airbag 44 in the vehicle-height direction is reduced, and the accordion-folded lower portion and the rolled-up upper portion come closer to the center. As a result, the accordion-folded lower portion is placed adjacent to the rolled-up upper portion. Then, the rolled-up upper portion is placed on the accordion-folded lower portion. Thus, the process of folding the left airbag 44 is terminated. As a result, the left airbag 44 is folded to have a strip shape.

Next, the right airbag 46 is folded in the same manner. As a result, the right airbag 46 is also folded to have a strip shape. The left airbag 44 or the right airbag 46 may be folded first.

Figure 4A:
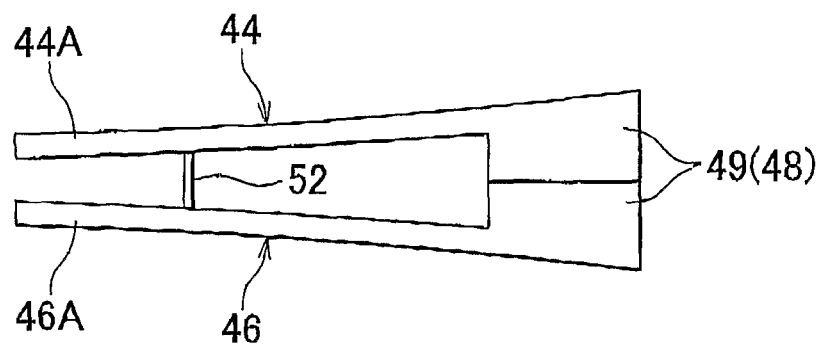
FIGS. 4A to 4C are diagrams showing the processes of the method of folding the passenger-seat airbag according to the embodiment of the invention.
Figure 4B:
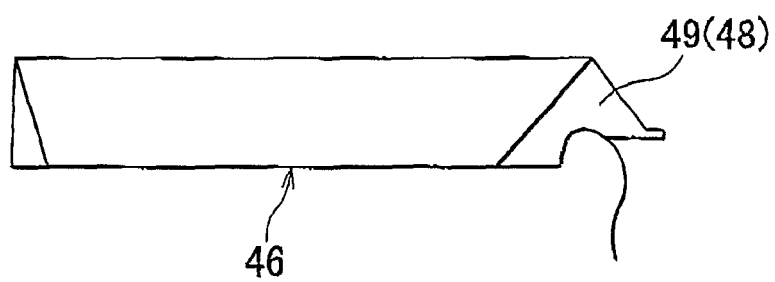
Figure 4C:
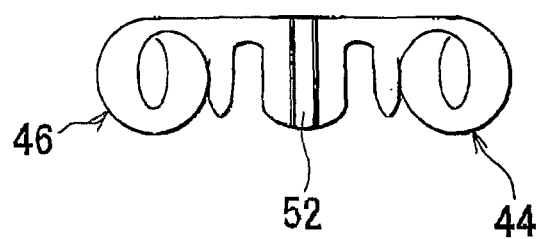

FIG. 4A, FIG. 4B, and FIG. 4C show the passenger-seat airbag 32 that is folded in the manner described above. In FIG. 4, the portion of the root portion 48 that is formed by making the root portion 48 slack, that is, the slack portion 49 of the root portion 48, is denoted by a reference numeral "49".

As shown in FIG. 5A, the passenger-seat airbag 32 is turned around to the opposite direction so that the slack portion 49 is positioned on the left side. Also, the left airbag 44 is overlapped with the right airbag 46. The tip portion 44A of the left airbag 44 (i.e., the tip portion ahead of the tie panel 52) and the tip portion 46A of the right airbag 46 (i.e., the tip portion ahead of the tie panel 52) are bent by 45 degrees so that the tip portion 44A and the tip portion 46A are apart from each other. As a result, the entire passenger-seat airbag 32 has a T-shape.

Figure 6A:
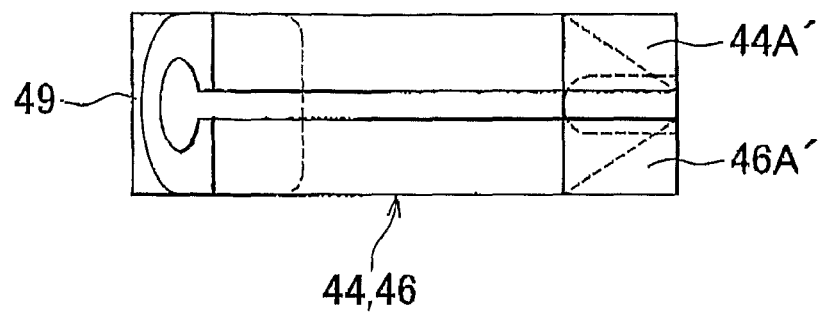
FIGS. 6A to 6C are diagrams showing the processes of the method of folding the passenger-seat airbag according to the embodiment of the invention.
Figure 6B:
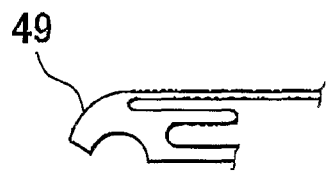
Figure 6C:
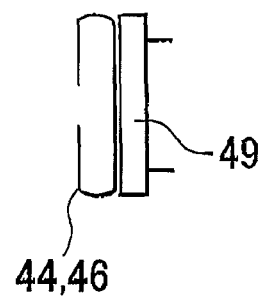

Then, the protruding portion 44A' of the tip portion 44A and the protruding portion 46A' of the tip portion 46A are folded toward the center so that the entire passenger-seat airbag 32 has the shape shown in FIG. 6A, FIG. 6B, and FIG. 6C.

Figure 7A:
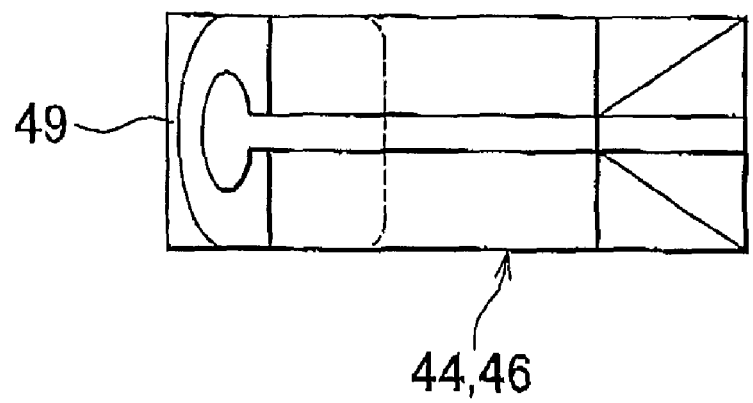
FIGS. 7A and 7B are diagrams showing the processes of the method of folding the passenger-seat airbag according to the embodiment of the invention.
Figure 7B:
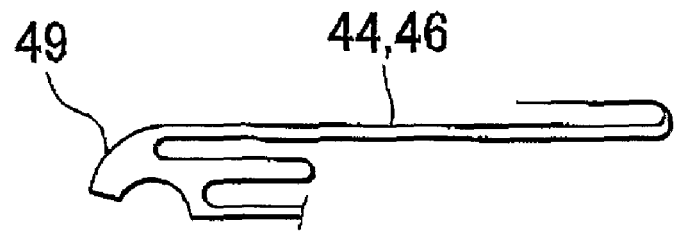
Figure 8A:
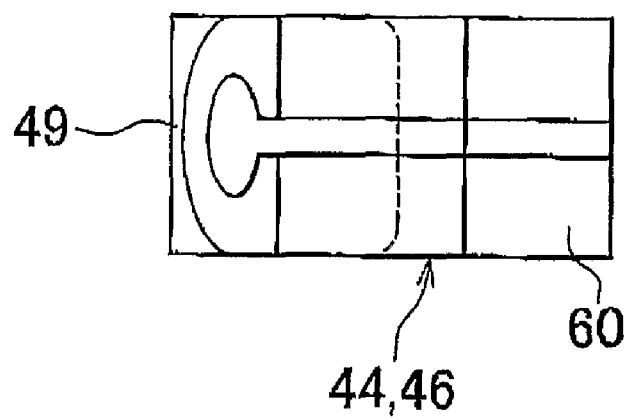
FIGS. 8A and 8B are diagrams showing the processes of the method of folding the passenger-seat airbag according to the embodiment of the invention.
Figure 8B:
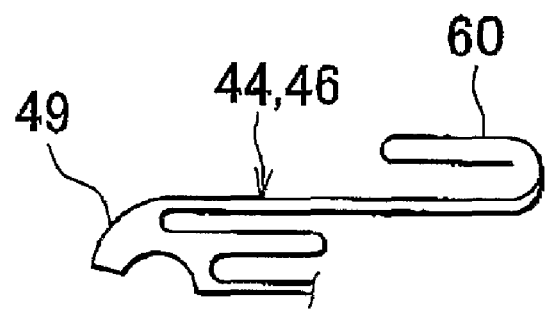
Figure 9A:
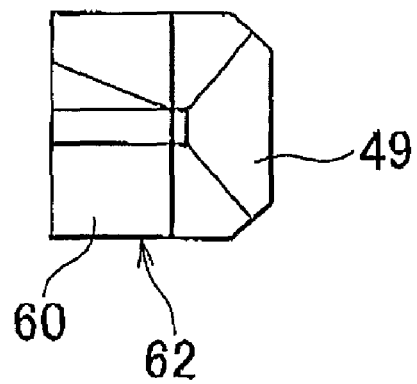
FIGS. 9A and 9B are diagrams showing the processes of the method of folding the passenger-seat airbag according to the embodiment of the invention.
Figure 9B:
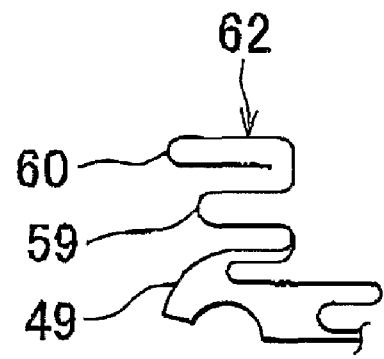

Subsequently, as shown in FIG. 7A and FIG. 7B, while the left airbag 44 is overlapped with the right airbag 46, the end portion of the left and right airbags 44 and 46 in a longitudinal direction (i.e., the end near the tie-panel 52) is rolled up toward the slack portion 49. FIG. 7A and FIG. 7B show the passenger-seat airbag 32 in which the end portion of the left and right airbags 44 and 46, which is distant from the slack portion 49, is rolled up once. FIG. 8A and FIG. 8B show the passenger-seat airbag 32 in which the end portion of the left and right airbags 44 and 46, which is distant from the slack portion 49, is rolled up twice. Finally, the end portion of the left and right airbags 44 and 46, which is close to the slack portion 49, is accordion-folded once, and a rolled-up portion 60 is placed on an accordion-folded portion 59 to form an airbag folded portion 62, as shown in FIG. 9A and FIG. 9B.

Figure 10A:
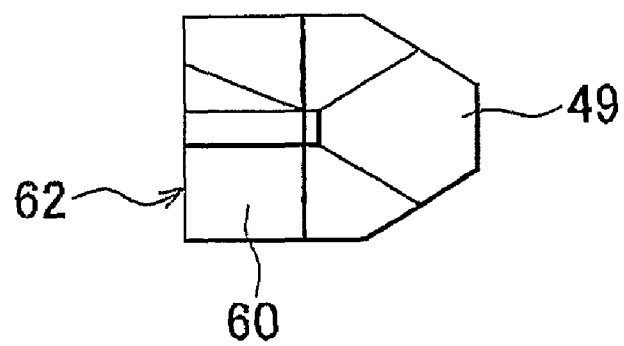
FIGS. 10A and 10B are diagrams showing the processes of the method of folding the passenger-seat airbag according to the embodiment of the invention.
Figure 10B:
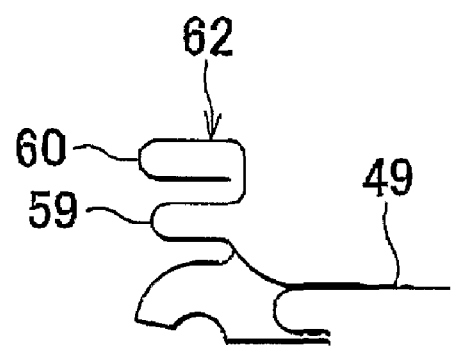

Subsequently, the slack portion 49 is extended as shown in FIG. 10A and FIG. 10B. Then, the slack portion 49 is made upright along the airbag folded portion 62, as shown in FIG. 11A, FIG. 11B, and FIG. 11C. The entire length of the slack portion 49 is slightly larger than the height of the airbag folded portion 62. Therefore, a tip portion 49A that protrudes beyond the airbag folded portion 62 is accordion-folded once toward the airbag folded portion 62 (i.e., toward the rear of the vehicle). The tip portion 49A may be accordion-folded while the slack portion 49 is made upright. Alternatively, the tip portion 49A may be accordion-folded before or after the slack portion 49 is made upright.

Figure 12:
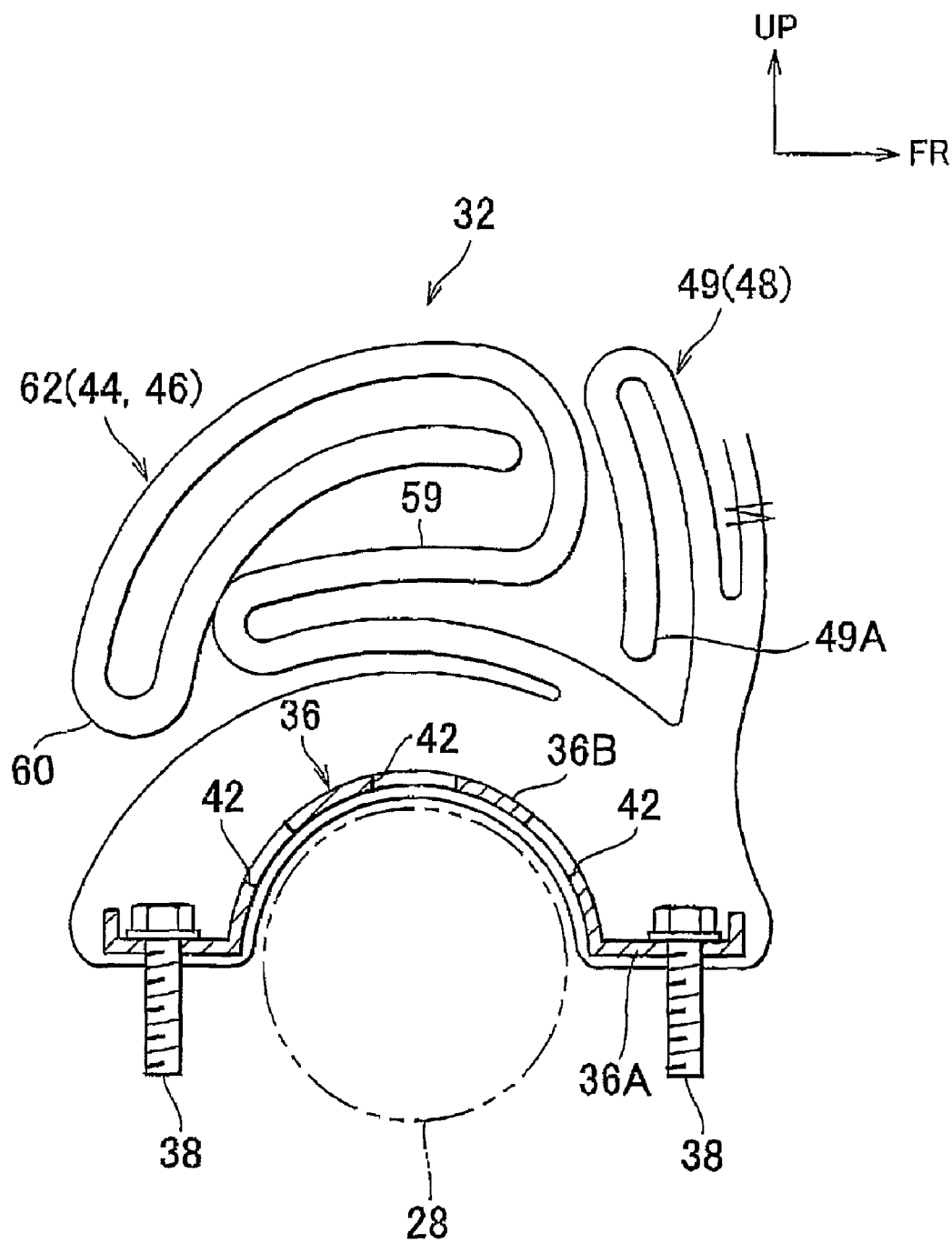
FIG. 12 is a diagram showing the method of folding the passenger-seat airbag according to the embodiment of the invention, and is a front view (partially cross sectional view) showing the state of the passenger-seat airbag when the processes are finished.
Figure 13:
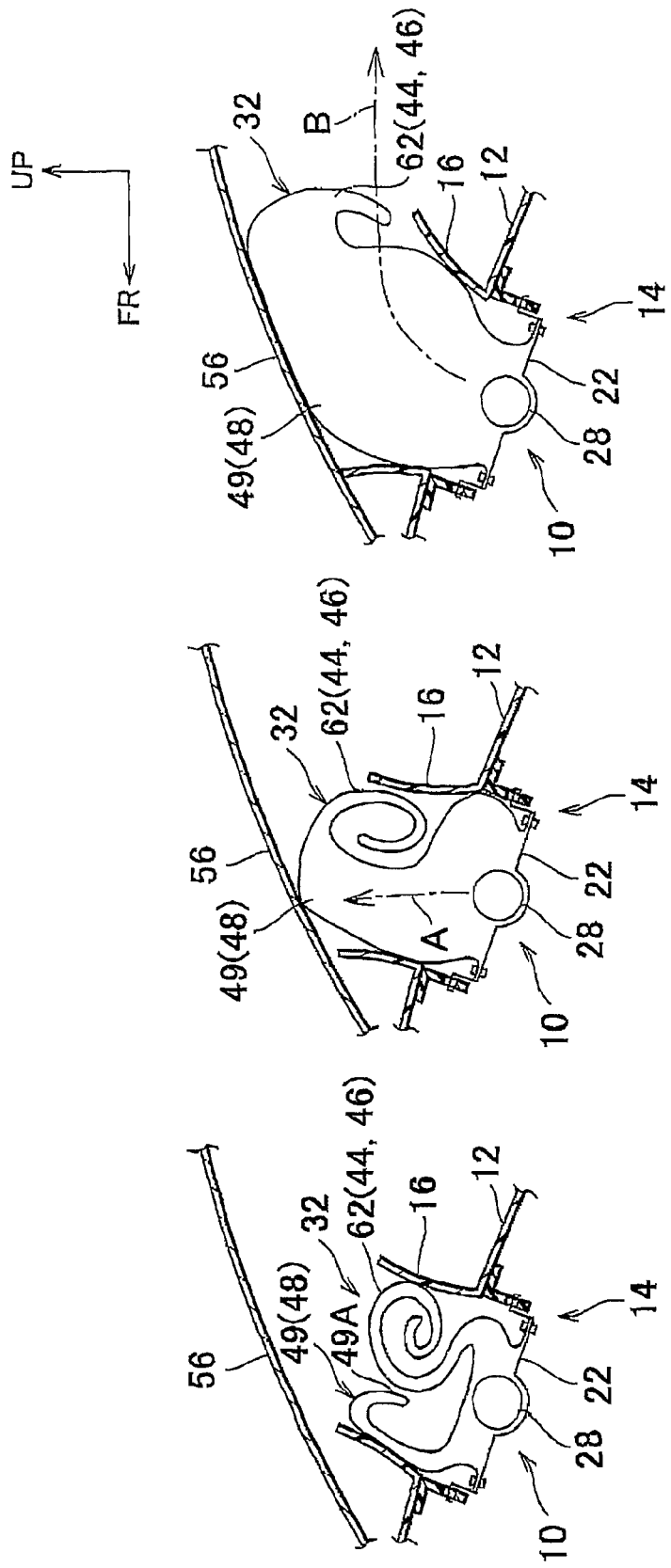
FIGS. 13A to 13C are explanatory diagrams explaining the effects of the method of folding the passenger-seat airbag according to the embodiment of the invention.

The passenger-seat airbag 32, which is folded in the above-described manner, is housed in the airbag case 22 such that the slack portion 49 is positioned closer to the front of the vehicle than the airbag folded portion 62 is, and the airbag folded portion 62 is positioned closer to the rear of the vehicle than the slack portion 49 is when the airbag case 22 is provided in the vehicle, as shown in FIG. 12. The slack portion 49 forms the root portion 48. The airbag folded portion 62 forms the left airbag 44 and the right airbag 46. Then, the airbag case 22 is fitted to the instrument panel 12.

III. Main Portion in the Embodiment

In this embodiment, in the above-described method of folding the passenger-seat airbag 32, the both side portions of the root portion 48 are accordion-folded to form an accordion-folded portion 72 at a time point between the process shown in FIG. 4, and the process shown in FIG. 5. Hereinafter, the process of accordion-folding the both side portions of the root portion 48 will be described in detail.

Figure 14:
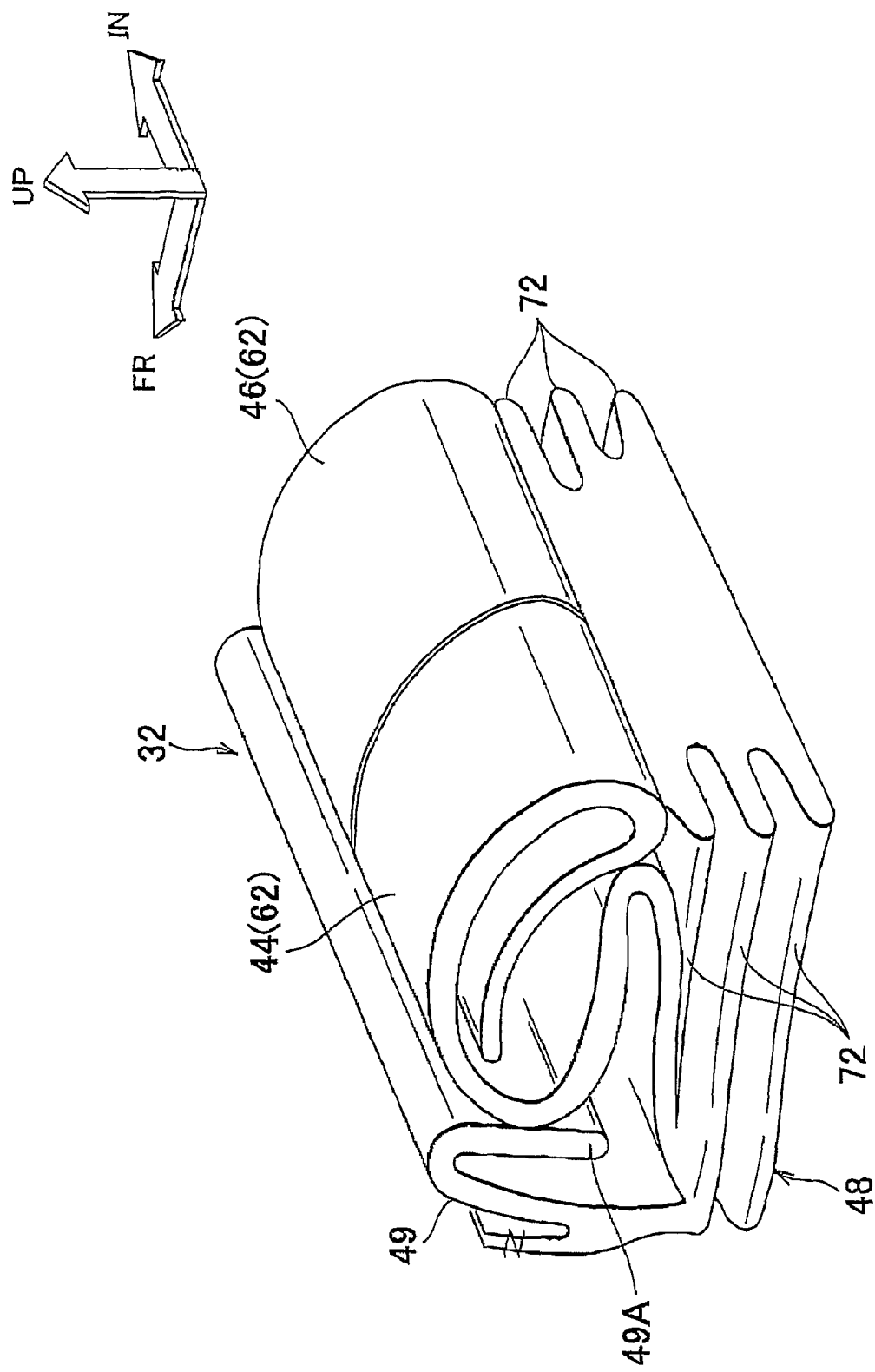
FIG. 14 is a perspective view showing the appearance of the passenger-seat airbag that is folded according to the method of folding the passenger-seat airbag according to the embodiment of the invention.
Figure 15:
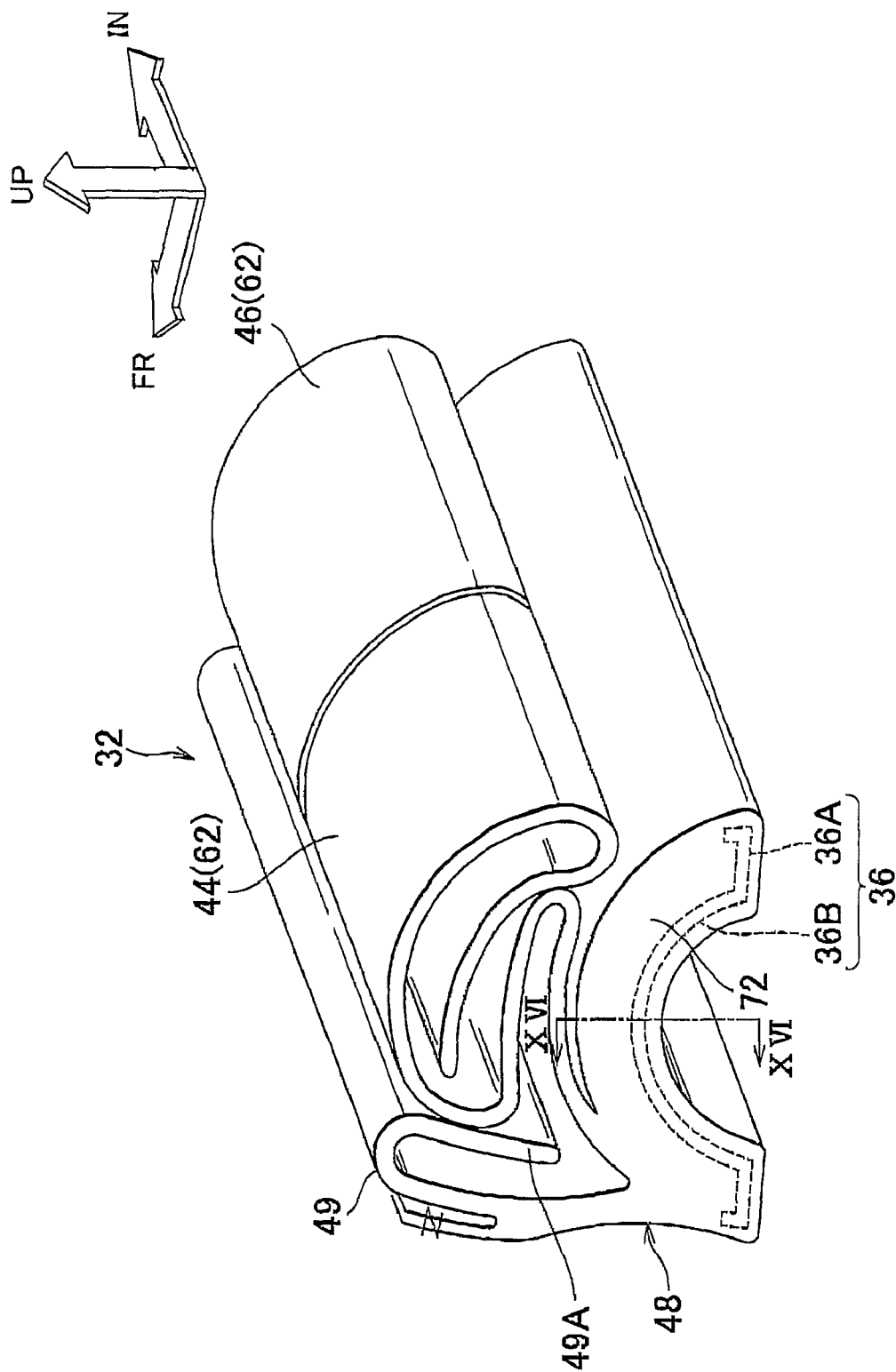
FIG. 15 is a perspective view showing the appearance of the passenger-seat airbag shown in FIG. 14, which is compressed in a vehicle-height direction.

As shown in FIG. 14, when the above-described passenger-seat airbag 32 is completely folded, the accordion-folded portion 72 is formed by accordion-folding the both side portions of the root portion 48. The folding widths (i.e., the lengths between the ridges and the troughs of the accordion-folded portion 72) are relatively small. As shown in FIG. 15 for reference, when the passenger-seat airbag device 10 is actually provided in the vehicle, the passenger-seat airbag 32 is compressed along the arc shape of the body 36B of the retainer 36 in the direction of the thickness of the passenger-seat airbag 32 (i.e., in the vehicle-height direction). Therefore, when the passenger-seat airbag 32 is in this state, the accordion-folded portion 72 is pressed.

The shape of the root portion 48 of the passenger-seat airbag 32 viewed from the outside has been described. Next, the relation between the accordion-folded portion 72 with relatively small folding widths and the functional components inside the airbag module 14 will be described.

Figure 16:
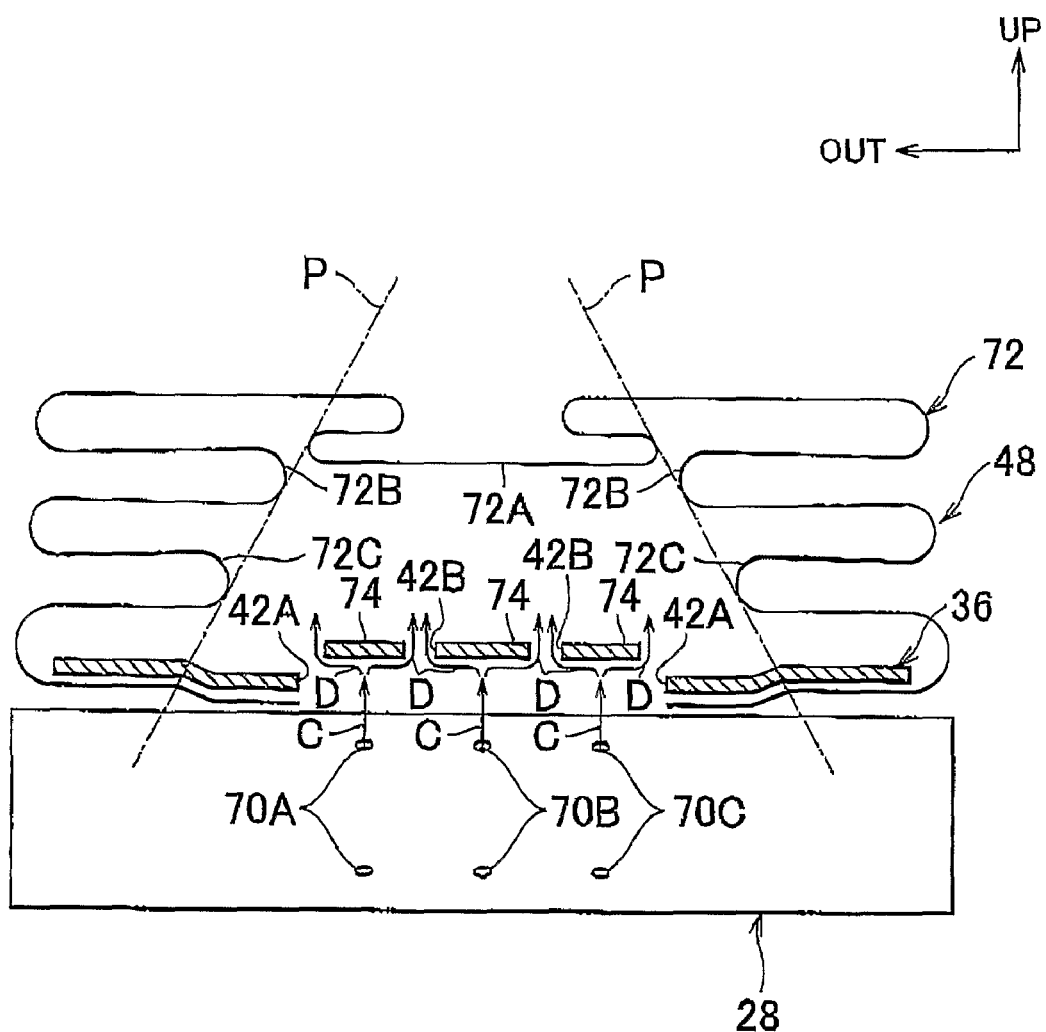
FIG. 16 is an enlarged cross sectional view showing the main portion in the embodiment of the invention, taken along line XVI-XVI of FIG. 15.

FIG. 16 shows the relation between the accordion-folded portion 72 of the root portion 48, and the inflator 28 and the retainer 36 that is regarded as the flow-adjusting means. The six gas-injection holes 70 are formed on the upper surface of the peripheral wall of the inflator 28. Also, the six gas-injection holes 70 are formed on the lower surface of the peripheral wall of the inflator 28. In FIG. 16, the three gas-injection holes 70 in one half of the upper surface, and the three gas-injection holes 70 in one half of the lower surface (i.e., the six gas-injection holes 70 in total) are shown. Also, the four openings 42 of the retainer 36, that adjust the flow of the gas, are shown. Because walls 74 are provided at three positions at the center of the retainer 36, two openings (42A) are formed to be closest to ends of the inflator 28 in the longitudinal direction, and two openings (42B) are formed at the center in the longitudinal direction of the inflator 28. However, because the gas-injection holes 70 are opposite to the respective walls 74, the gas injected through the gas-injection holes 70 of the inflator 28 flows straight to hit the walls 74 as shown by an arrow C, and then flows through the openings 42A and 42B formed on the both sides of the walls 74. Thus, the gas is supplied into the root portion 48.

In this embodiment, the accordion-folded portion 72 with relatively small folding widths is formed by accordion-folding the both side portions of the root portion 48, as described above. This prevents the openings 42 of the retainer 36 from being closed by the root portion 48. More specifically, the accordion-folded portion 72 includes a center accordion-folded portion 72A, a first accordion-folded portion 72B, and a second accordion-folded portion 72C. When viewed from the inside of the passenger-seat airbag 32, the center accordion-folded portion 72A is suspended at the center of the passenger-seat airbag 32, and the first and second accordion-folded portions 72B and 72C are formed at the both side portions of the root portion 48, and protrude toward the inside of the root portion 48. The folding width of the accordion-folded portion 72 decreases toward the body 36B of the retainer 36. Thus, as shown by chain lines P in FIG. 16, the folding widths are defined so that the distance between lines connecting the ridges of the center accordion-folded portion 72A, the ridges of the first accordion-folded portion 72B and the ridges of the second accordion-folded portion 72C increases toward the body 36B of the retainer 36. Thus, when the root portion 48 is compressed in the vehicle-height direction, at least the openings 42A closest to the ends of the inflator 28 in the longitudinal direction are prevented from being closed by the root portion 48 (it is important that the openings 42A closest to the ends of the inflator 28 in the longitudinal direction should not be closed). Further, the center accordion-folded portion 72A is formed in the root portion 48 at a position close to a ceiling, and each of the first and second accordion-folded portions 72B and 72C has a certain thickness. This also prevents the openings 42A from being closed by the root portion 48.

IV. Effects

Next, the effects obtained in this embodiment will be described.

First, the overall effect of the passenger-seat airbag device 10 in this embodiment will be summarized. When the front airbag sensor and the center airbag sensor (neither of them are shown) detect a frontal collision, the airbag ECU (not shown) operates the inflator 28 so that gas is injected through the plurality of gas-injection holes formed in the peripheral wall of the inflator 28. After the retainer 36, which functions as the diffuser, adjusts the flow of the injected gas, the gas flows into the passenger-seat airbag 32 from the openings 42 of the retainer 36.

Accordingly, the passenger-seat airbag 32 is inflated. When the pressure inside the passenger-seat airbag 32 reaches a predetermined value, the airbag door 16 is torn along the tear line 18. Thus, the passenger-seat airbag 32 is deployed toward the windshield 56. As a result, the left airbag 44 receives mainly the left shoulder of the occupant seated at the passenger seat 30. The right airbag 46 receives mainly the right shoulder of the occupant. Further, the tie-panel 52 receives mainly the chest of the occupant. As a result, the passenger-seat airbag 32 protects the occupant from the impact of the frontal collision. In addition, as shown in FIG. 3, immediately after the passenger-seat airbag 32 starts to be deployed, the passenger-seat airbag 32 receives the occupant at a plurality of portions such as the shoulders, and the load applied to the occupant can be dispersed. Accordingly, the load applied to the occupant can be reduced.

Subsequently, the effects of the method of folding the passenger-seat airbag 32 according to the embodiment will be summarized.

When the passenger-seat airbag 32 is folded according to the above-described folding method, the airbag folded portion 62 is positioned closer to the rear of the vehicle than the slack portion 49 is, when the passenger-seat airbag device 10 is fitted to the instrument panel 12. The airbag folded portion 62 forms the left airbag 44 and the right airbag 46, and occupies a large portion of the passenger-seat airbag 32. Also, the slack portion 49 is made upright along the airbag folded portion 62, and is positioned closer to the front of the vehicle than the airbag folded portion 62 is. The slack portion 49 forms the root portion 48 that connects the root portion of the left airbag 44 (left-airbag root portion) and the root portion of the right airbag 46 (right-airbag root portion).

When the passenger-seat airbag device 10 operates after the airbag folded portion 62 and the slack portion 49 are positioned in the above-described manner, it takes time for the gas to flow into the airbag folded portion 62 that is formed by rolling-up the left and right airbags 44 and 46 twice and accordion-folding the left and right airbags 44 and 46 once, as shown in FIG. 13A. That is, the airbag folded portion 62 is not unfolded easily. Therefore, the gas intensively flows into the slack portion 49, and the slack portion 49 is instantly inflated. The slack portion 49 is upright in the substantially vehicle-height direction, and the gas flows into the slack portion 49 easily. Thus, as shown in FIG. 13B, the slack portion 49 is expanded toward the top of the vehicle (i.e., in the direction shown by an arrow "A" in FIG. 13B). The slack portion 49 contacts the windshield 56, and forms the root portion 48.

Because the root portion 48 is expanded and deployed quickly toward the substantially top of the vehicle, a "wall" sufficiently stretched by the gas is formed in an airbag deployment area at the position close to the front of the vehicle. Then, as shown in FIG. 13C, the airbag folded portion 62 is unfolded by the reaction force from the "wall", and the airbag folded portion 62 is deployed toward the occupant seated at the passenger seat 30 (i.e., in the direction shown by an arrow "B" in FIG. 13C). Thus, the left airbag 44 and the right airbag 46 are formed. That is, the gas is intensively delivered to the slack portion 49 at the extremely early stage of deployment, and the slack portion 49 is expanded in a predetermined direction to form the "wall". The slack portion 49 forms the root portion 48 that supplies the gas to both of the left airbag 44 and the right airbag 46. As a result, the left airbag 44 and the right airbag 46 are extremely stably expanded and deployed toward the passenger seat 30 in the direction shown by the arrow "B". In FIG. 13C, the arrow "B" indicates the trajectory of the movement of the center of the airbag folded portion 62.

Next, the effects of the accordion-folded portion 72 formed by accordion-folding the both side portions of the root portion 48 according to the embodiment will be described.

Figure 17A:
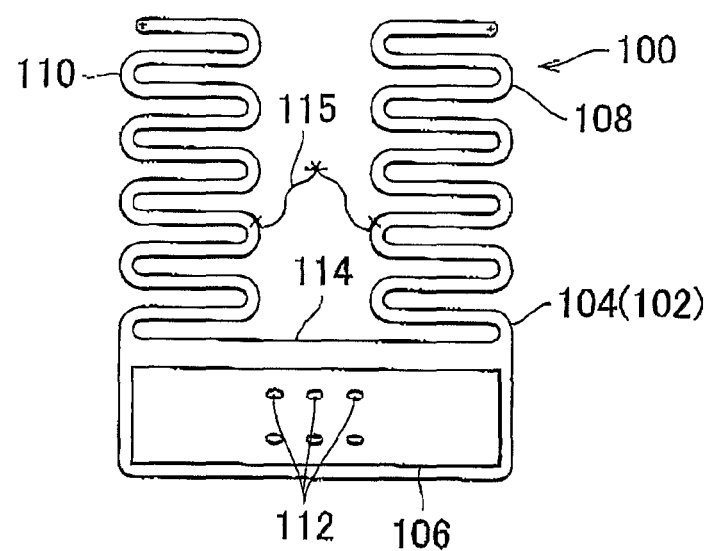
FIGS. 17A and 17B are schematic diagrams explaining the effects of a passenger-seat airbag that is folded according to a conventional folding method.
Figure 17B:
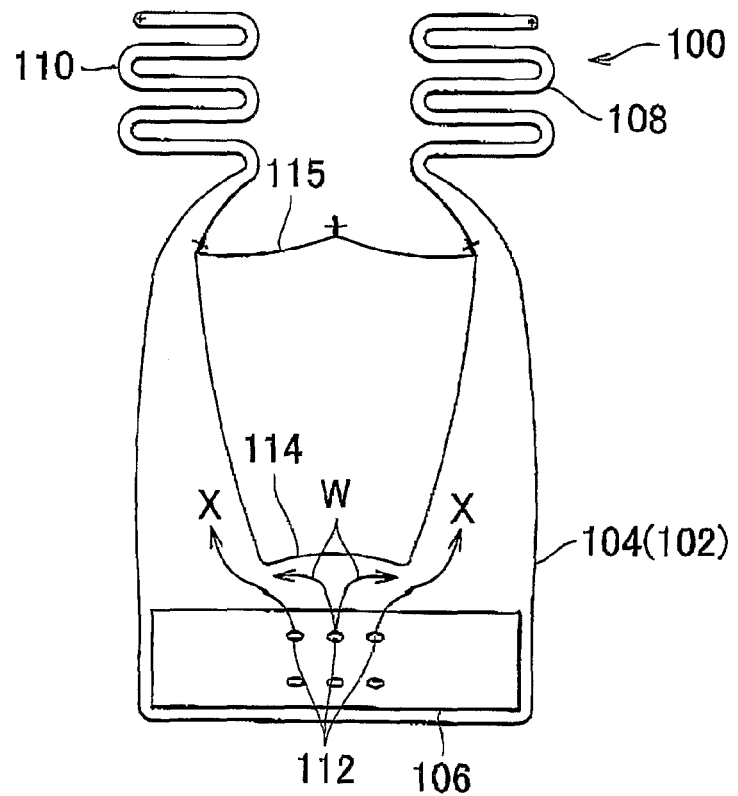
Figure 18:
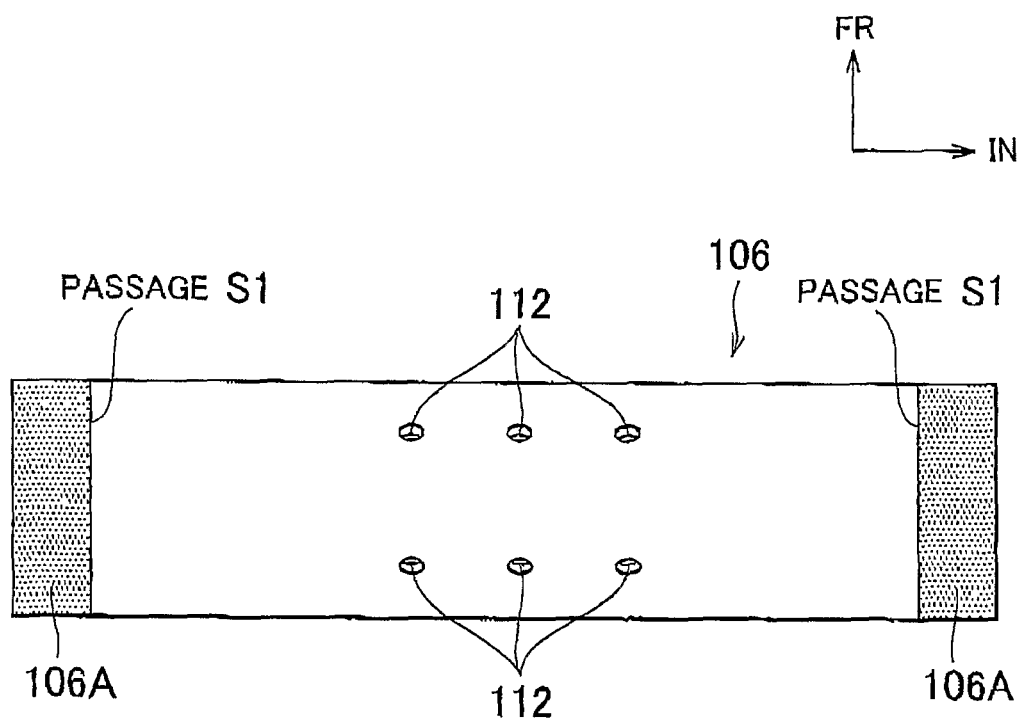
FIG. 18 is an enlarged front view of an inflator, which shows passages through which gas is supplied from the inflator.

FIGS. 17A and 17B schematically show a passenger-seat airbag 100 that is folded according to a conventional folding method, and that starts to be deployed. As shown in FIGS. 17A and 17B, an accordion-folded portion 104 with relatively large folding widths is formed by accordion-folding the both side portions of a root portion 102. Further, a connection portion 114 of the root portion 102, which connects the root portion of a left airbag 108 and the root portion of a right airbag 110, is positioned directly above the gas-injection holes 112 of an inflator 106. Further, when the passenger-seat airbag 100 is actually provided in the vehicle, the passenger-seat airbag 100 is not in the state shown in FIG. 17A. Instead, the passenger-seat airbag 100 is compressed toward the inflator 106. Therefore, the gas-injection holes 112 are closed by the connection portion 114. As a result, no gas passage is formed above the gas-injection holes 112 of the inflator 106. That is, as shown in FIG. 18, gas passages S1 are formed only above both side portions 106A of the inflator 106 in the longitudinal direction. A tie panel 115 is positioned between the left airbag 108 and the right airbag 110, and connects the left airbag 108 and the right airbag 110 in the vehicle-width direction.

If the inflator 106 operates and the gas is injected through the gas-injection holes 112 when the passenger-seat airbag 100 is in this state, the entire passenger-seat airbag 100 is protruded toward the top of the vehicle (shown by arrows W in FIG. 17B). Then, while the root portion 102 is inflated, the gas flows into the left and right airbags 108 and 110, and the left and right airbags 108 and 110 are inflated and deployed (as shown by arrows X in FIG. 17B). That is, before the root portion 102 is completely inflated, the left and right airbags 108 and 110 start to be inflated and deployed. Accordingly, the direction in which the left and right airbags 108 and 110 are deployed is deviated upward, downward, leftward or rightward from a given direction. That is, the left and right airbags 108 and 110 are not stably deployed in the given direction.

Figure 19A:
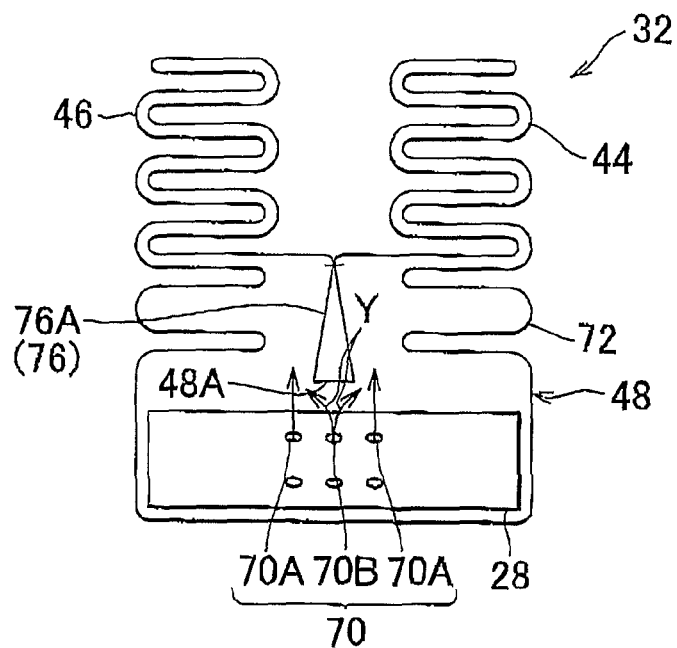
FIGS. 19A and 19B are schematic diagrams explaining the effects of the passenger-seat airbag that is folded according to the folding method according to the embodiment of the invention.
Figure 19B:
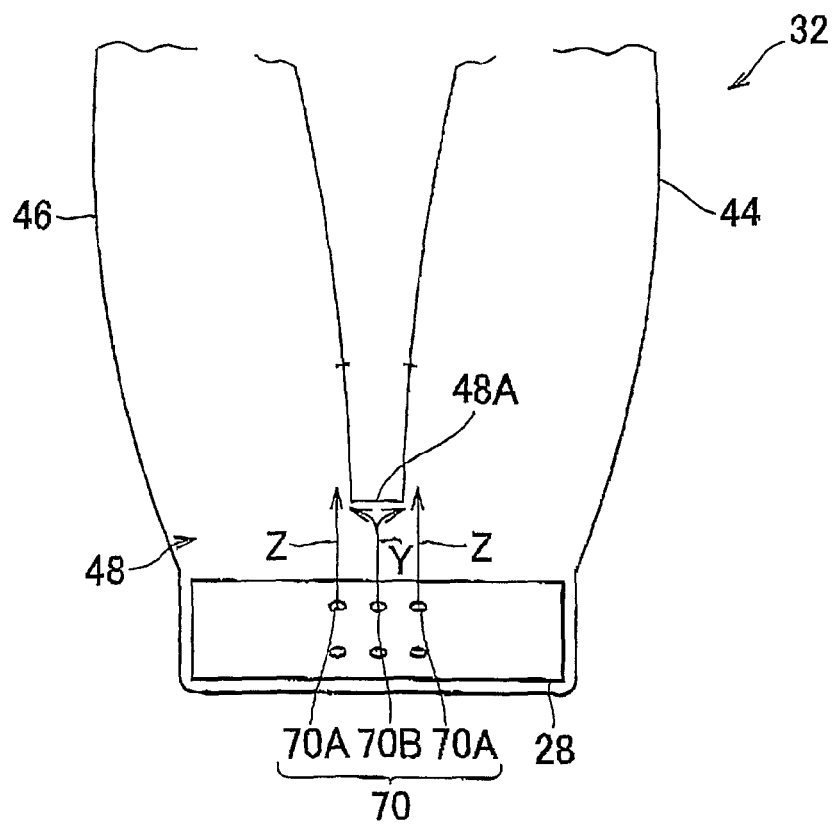
Figure 20:
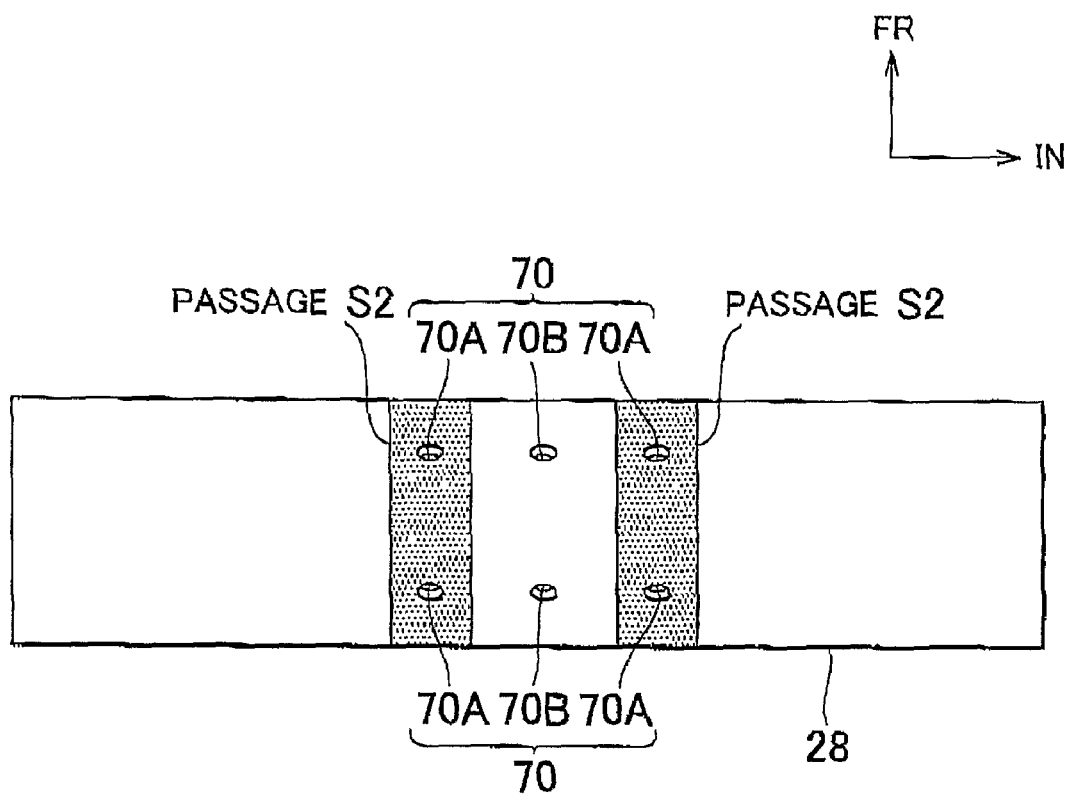
FIG. 20 is an enlarged front view of an inflator, which shows passages through which gas is supplied from the inflator in the case shown in FIG. 19.

In contrast, in this embodiment, the state of the passenger-seat airbag 32 is as shown in FIGS. 19A and 19B. The root portion 48 has the inner structure shown in FIG. 16, as described above. FIGS. 19A and 19B are schematic diagrams showing the passenger-seat airbag 32 in comparison with the above-described conventional technology.

In this embodiment, the accordion-folded portion 72 with relatively small folding widths is formed by accordion-folding the both side portions of the root portion 48 of the passenger-seat airbag 32, as described above. This prevents the gas-injection holes 70 of the inflator 28 from being closed. FIG. 19A schematically shows that at least the gas-injection holes 70A closest to the ends of the inflator 28 in the longitudinal direction are prevented from being closed, in comparison with FIG. 17. In other words, inner base cloth 76 that closes the gas-injection holes 70 is unfolded and moved from the left portion and the right portion of the accordion-folded portion 72 of the root portion 48, toward the center of the passenger-seat airbag 32. Thus, a bell portion 76A having a substantially triangle shape is formed. This prevents the root portion 48 from closing the passages for the gas injected through the gas-injection holes 70A closest to the ends of the inflator 28 in the longitudinal direction. That is, the accordion-folded portion 72 with relatively small folding widths is formed by accordion-folding the both side portions of the root portion 48 only at positions corresponding to the both end portions of the inflator 28 in the longitudinal direction of the inflator 28. Thus, as shown in FIG. 20, gas passages S2 are formed, and the gas injected from the gas-injection holes 70A closest to the ends of the inflator 28 in the longitudinal direction flows through the gas passages S2, although the gas-injection holes 70B at the center of the inflator 28 are closed by the bell portion 76A. As a result, the root portion 48 can be quickly inflated and deployed.

Accordingly, if the inflator 28 operates and the gas is injected through the gas-injection holes 70 when the passenger-seat airbag 32 is in this state, the gas injected through the gas-injection holes 70B at the center of the inflator 28 hits the bottom surface of the bell portion 76A, that is, the connection portion 48A that connects the root portion of the left airbag 44 and the root portion of the right airbag 46 (i.e., the left-airbag root portion and the right-airbag root portion), as shown by arrows Y in FIGS. 19A and 19B. However, the gas injected through the gas-injection holes 70A closest to the ends of the inflator 28 in the longitudinal direction flows through the gas passages S2 to inflate and deploy the root portion 48 quickly (as shown by arrows Z in FIGS. 19A and 19B). Then, the left and right airbags 44 and 46 are inflated and deployed by the reaction force from the root portion 48 that is completely inflated and deployed. Accordingly, the direction in which the left and right airbags 44 and 46 are deployed is not deviated upward, downward, leftward or rightward from the given direction. That is, the left and right airbags 44 and 46 are stably deployed in the given direction.

As described above, in the passenger-seat airbag device and the method of folding the passenger-seat airbag according to the embodiment, it is possible to avoid in advance the situation where all the gas-injection holes 70 of the inflator 28 (all the openings 42 of the retainer 36 if the retainer 36 is provided) are closed by the folded root portion 48. Therefore, the root portion that connects the root portion of the left airbag 44 and the root portion of the right airbag (i.e., the left-airbag root portion and the right-airbag root portion) can be quickly and reliably inflated so that the root portion 48 functions as "the wall" in the extremely early stage. As a result, in the embodiment, it is possible to extremely effectively stabilize the direction in which the left and right airbags 44 and 46 are expanded and deployed, thereby improving the accuracy of the direction in which the passenger-seat airbag 32 is deployed.

Particularly, the gas-injection holes 70A closest to the ends of the inflator 28 in the longitudinal direction, other than the gas-injection holes 70B at the center of the inflator 28 (the openings 42A closest to the ends of the inflator 28 in the longitudinal direction, other than the openings 42B at the center of the retainer 36, if the retainer 36 is provided) are prevented from being closed. Therefore, the root portion 48 can be quickly and reliably inflated, and the gas is supplied directly to the left and right airbags 44 and 46 through the shortest passage. Accordingly, the left and right airbags 44 and 46 can be simultaneously and quickly deployed. This is extremely effective in stabilizing the direction in which the left and right airbags 44 and 46 are deployed.

V. Supplementary Explanation of the Embodiment

In the passenger-seat airbag device 10 according to the above-described embodiment, the gas-injection holes 70A closest to the ends of the inflator 28 in the longitudinal direction, other than the gas-injection holes 70B at the center of the inflator 28 (the openings 42A closest to the ends of the inflator 28 in the longitudinal direction, other than the openings 42B at the center of the retainer 36, if the retainer 36 is provided) are prevented from being closed. However, at least one of the gas-injection holes 70 (at least one of the openings 42) at any position may be prevented from being closed.

Also, in the passenger-seat airbag device 10 according to the above-described embodiment, the retainer 36 is provided. However, the invention is not limited to this configuration. That is, the invention may be applied also to the configuration in which the retainer 36 is omitted.

Further, in the method of folding the passenger-seat airbag 32 according to the above-described embodiment, the both side portions of the root portion 48 are accordion-folded at a time point between the folding process shown in FIG. 4 and the folding process shown in FIG. 5. However, the invention is not limited to this method. That is, the both side portions of the root portion 48 may be accordion-folded at another time point.

While the invention has been described with reference to example embodiment thereof, it should be understood that the invention is not limited to the example embodiments or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. A passenger-side airbag device comprising:
a passenger-side airbag that includes a left airbag portion and a right airbag portion that correspond to respective left and right shoulders of an occupant seated in a passenger seat, and a root portion that connects a left-airbag root portion and a right-airbag root portion; and
an inflator which is formed to be elongate, which has a plurality of gas-supply holes, and which supplies gas into the passenger-side airbag through the plurality of the gas-supply holes when a collision occurs,
wherein the inflator and the passenger-side airbag are stored in an airbag case fixed in an instrument panel, the passenger-side airbag being stored in a folded state; and
wherein an accordion-folded portion is formed by accordion-folding both side portions of the root portion only at positions corresponding to both end portions of the inflator in a longitudinal direction of the inflator, the both side portions being accordion-folded along the longitudinal direction of the inflator, whereby at least the plurality of the gas-supply holes, which are closest to the end portions of the inflator in the longitudinal direction and are positioned longitudinally inward of first inner ridges of the accordion-folded portion closest to the inflator and positioned inward of outer ridges, the inner ridges being defined by longitudinally inward-facing, convex surfaces of both side portions, are prevented from being closed by the root portion that is in a folded state when the passenger-side airbag device is provided in a vehicle.

2. The passenger-side airbag device according to claim 1, wherein a folding width of the accordion-folded portion, which is a distance between the ridge and a trough of the accordion-folded portion, at a position close to the inflator is smaller than a folding width of the accordion-folded portion at a position distant from the inflator.

3. The passenger-side airbag device according to claim 1, wherein a bell portion that has a substantially triangle shape is formed by unfolding a left inner portion and a right inner portion of the accordion-folded portion of the root portion, and moving the left inner portion and the right inner portion toward a center of the passenger-side airbag.

4. The passenger-side airbag device according to claim 1, wherein the inflator has a substantially cylindrical shape; wherein the plurality of the gas-supply holes are a plurality of gas-injection holes that are formed in a peripheral wall of the inflator; and
wherein the gas is supplied to the root portion through the plurality of the gas-injection holes.

5. The passenger-side airbag device according to claim 1, wherein the inflator includes a flow-adjusting portion;
wherein the plurality of the gas-supply holes are a plurality of flow-adjusting holes of the flow-adjusting portion; and
wherein a flow of the gas is adjusted through the plurality of the flow-adjusting holes, and then the gas is supplied to the root portion.

6. The passenger-side airbag device according to claim 1, wherein the inflator has a plurality of gas-injection holes, and a retainer that has a plurality of flow-adjusting holes;
wherein the plurality of the gas-supply holes are the plurality of the flow-adjusting holes; and
wherein a flow of the gas injected through the gas-injection holes is adjusted through the plurality of the flow-adjusting holes, and then the gas is supplied to the root portion.

7. The passenger-side airbag device according to claim 6, wherein the retainer includes the plurality of the flow-adjusting holes and a wall; and
wherein the plurality of the gas-injection holes are disposed at positions facing the wall.

8. A method of folding a passenger-side airbag that includes a left airbag portion and a right airbag portion that correspond to respective left and right shoulders of an occupant seated in a passenger seat, and a root portion that receives gas supplied from an inflator that is formed to be elongate, and that supplies the gas through a plurality of gas-supply holes when the inflator operates, the root portion connecting a left-airbag root portion and a right-airbag root portion; comprising the steps of:
folding each of the left and right airbags such that each of the left and right airbags has a strip shape, overlapping the left and right airbags with each other, and then folding the left and right airbags that are overlapped with each other, toward one side in a longitudinal direction of the left and right airbags to form an airbag folded portion, wherein the left and right airbags are positioned closer to a rear of a vehicle than the root portion is when the passenger-side airbag is provided in the vehicle; and
making the root portion slack to form a slack portion, and making the slack portion upright along the airbag folded portion, wherein both side portions of the root portion are accordion-folded along a longitudinal direction of the inflator, only at positions corresponding to both end portions of the inflator in the longitudinal direction during a period from step of forming the airbag folded portion until the step of folding the root portion, whereby at least the plurality of the gas-supply holes of the inflator, which are closest to the end portions of the inflator in the longitudinal direction and are positioned longitudinally inward of first inner ridges of the accordion-folded portion closest to the inflator and positioned inward of outer ridges, the inner ridges being defined by longitudinally inward-facing, convex surfaces of both side portions, are prevented from being closed by the root portion that is in a folded state when the passenger-side airbag is provided in a vehicle.

* * * * *